Dec. 23, 1924.                                                                      1,520,076
A. E. PAIGE
VEHICLE LOCK AND ELECTRIC CIRCUIT
Filed April 7, 1924                 3 Sheets-Sheet 1
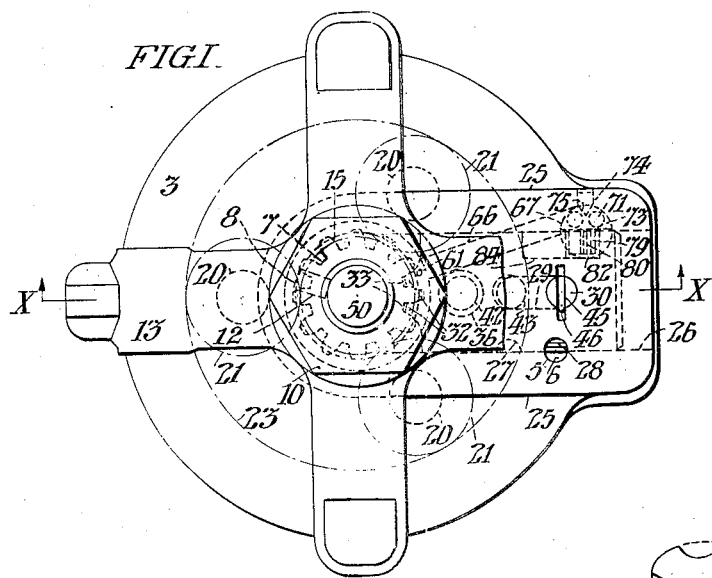
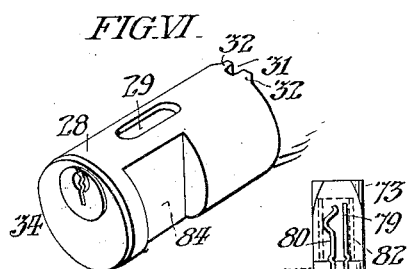
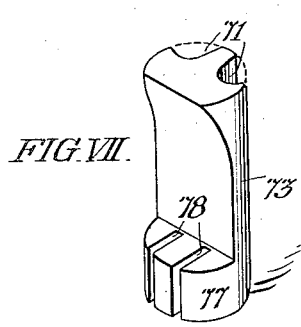
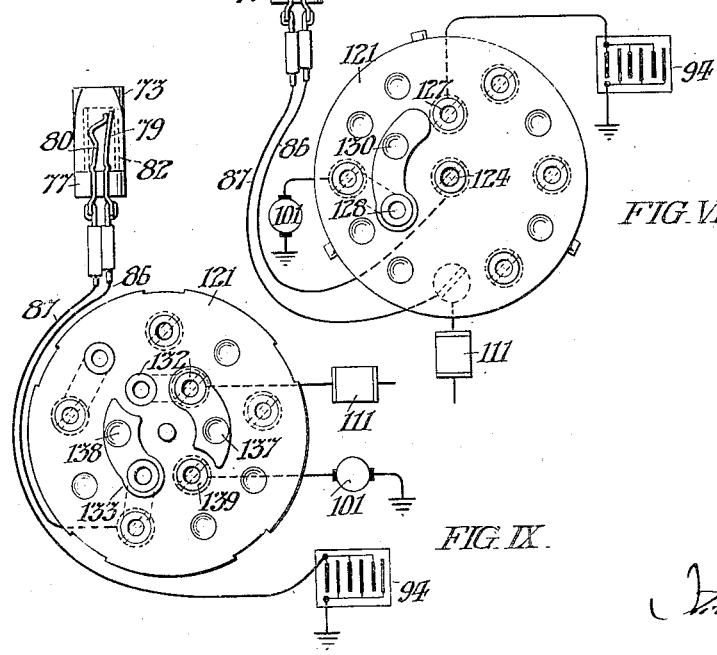
Inventor:

Dec. 23, 1924.                                                                    1,520,076
A. E. PAIGE
VEHICLE LOCK AND ELECTRIC CIRCUIT
Filed April 7, 1924                              3 Sheets-Sheet 2
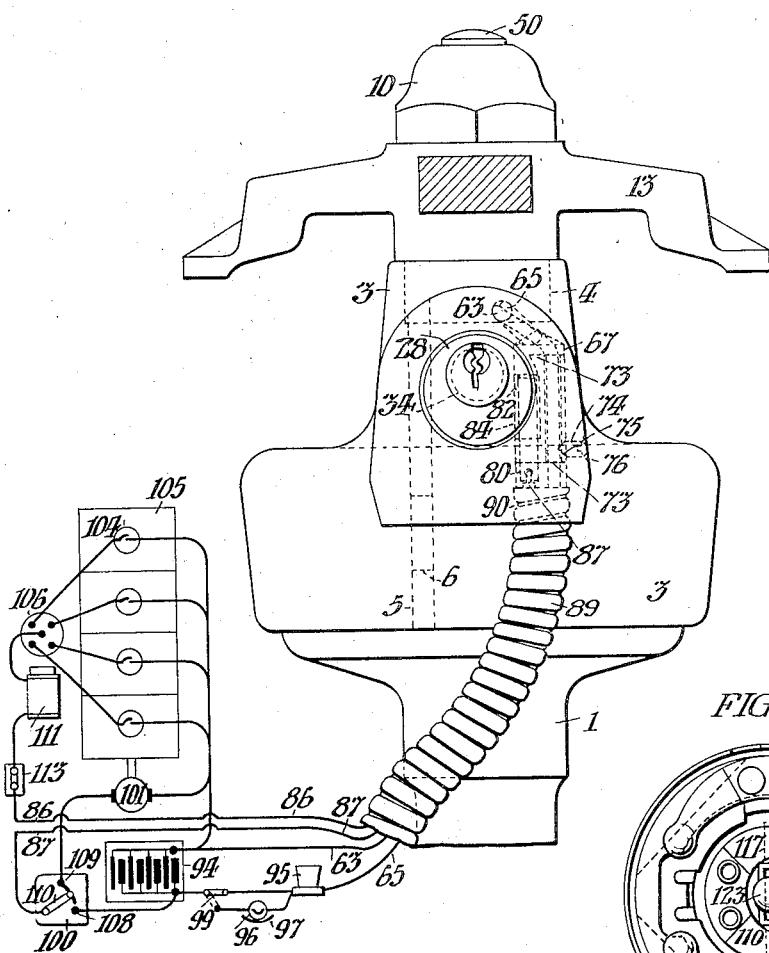
FIG. II.
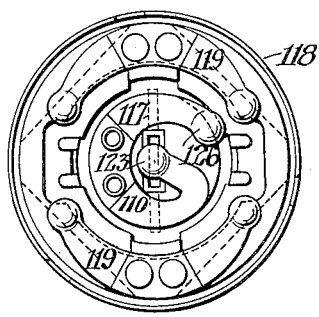
FIG. IV.
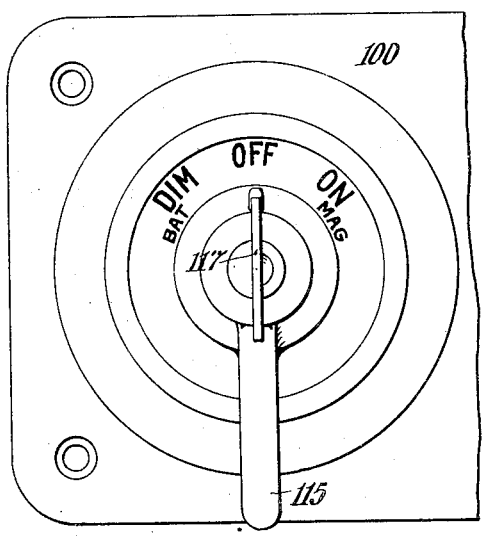
FIG. III.
FIG. V.
Inventor:
Arthur E. Paige

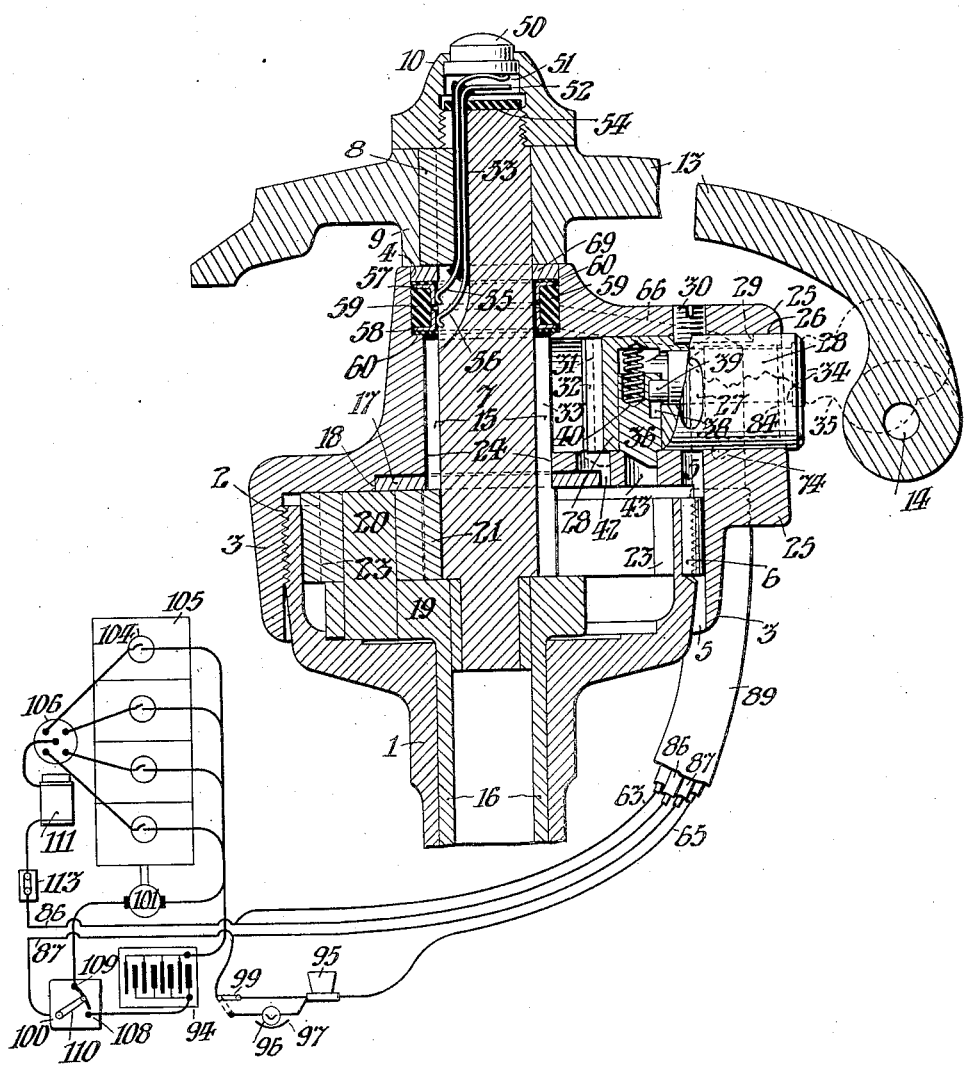

Patented Dec. 23, 1924.

1,520,076

UNITED STATES PATENT OFFICE.

ARTHUR E. PAIGE, OF PHILADELPHIA, PENNSYLVANIA.

VEHICLE LOCK AND ELECTRIC CIRCUIT.

Application filed April 7, 1924. Serial No. 704,857.

*To all whom it may concern:*

Be it known that I, ARTHUR E. PAIGE, a citizen of the United States, residing at Philadelphia, in the county of Philadelphia and State of Pennsylvania, have invented a certain new and useful Improvement in Vehicle Locks and Electric Circuits, whereof the following is a specification, reference being had to the accompanying drawings.

My invention is particularly applicable to automobiles and other self-propelled vehicles, and provides means whereby an electric circuit controlling the operation of the vehicle is so correlated to means for locking the vehicle, that the vehicle motor cannot be stopped unless and until the vehicle is locked; the object and effect of such construction and arrangement being to remind the operator to lock the vehicle before leaving it. In a form of my invention hereinafter described; the locking device is applied to the steering mechanism which latter includes a steering shaft having a rotary steering wheel and mounted to turn in a stationary tubular column or post, and includes means for detachably rigidly connecting such a steering shaft with the steering column, so as to prevent the vehicle from being steered when locked. In that embodiment; my invention is applied to an electric ignition circuit of the "Ford" type including spark plugs for the respective motor cylinders, a mechanically rotary generator, for instance, a magneto, and a chemical generator, for instance, a storage battery, so constructed and arranged that said generators may be alternately used to energize said ignition circuit by manipulation of a main ignition switch which is mounted upon the instrument board in the vehicle. That main switch ordinarily includes a battery terminal and a magneto terminal in such spaced relation that there is a blank "off" space between them, and a movable switch member which is permanently connected to the spark coil and thence to said plugs and which may be turned from one of said terminals to the other or left in said "off" space between them; it being the practice to turn the switch from "off" position to connect the coil with the battery terminal to start the vehicle and, after the motor begins to operate said rotary generator, to then manually shift said switch member from the battery terminal to the magneto terminal; the vehicle motor being stopped by returning said movable switch member to the "off" position from either said battery terminal or said magneto terminal. On the contrary; in accordance with my invention, the two generator terminals are so arranged in the ignition switch that there is no "off" space between them; so that when the operator turns said movable switch member to the nominally "off" position, such movement fails to stop the motor unless the vehicle is locked; because the circuit remains completed through said switch to one of said generators; preferably the rotary one. However, such completion is by way of an auxiliary circuit which includes an auxiliary switch so correlated to the locking mechanism that said auxiliary circuit is normally maintained closed at the auxiliary switch when the vehicle is unlocked, but said circuit is broken at said auxiliary switch when the vehicle is locked. Moreover, the preferable arrangement prevents the operator from again starting the vehicle motor until the vehicle is unlocked. A form of my invention herein disclosed includes another switch controlling a horn or other signal circuit associated with the motor controlling circuits above contemplated; but that form of my invention is the subject matter of my copending application Serial No. 701,597 for Letters Patent of the United States.

The form of my invention chosen for illustration is particularly applicable to an automobile mechanism of the "Ford" type, including a planetary train of gears of which the sun gear is carried by the steering shaft aforesaid. I have also found it convenient to employ locking mechanism including a lock body, of a pin tumbler key type, which body is mounted to reciprocate radially in a socket formed in a screw cap which serves as a cover for the internal gear case which is a stationary fixture at the top of said steering column; said lock body being arranged to engage said steering shaft to prevent rotation of the latter when in locked position. Said lock body may be manually thrust into said locked position without the employment of its key; the latter being required only to release and effect the withdrawal of the lock body from its locked position. Said auxiliary switch is so mounted in said lock socket that said auxiliary circuit is opened at said switch whenever said lock body is shifted to its locked position, in which the steering mechanism is inoperative; but is automatically closed when said lock body is withdrawn to release the steering mechanism. In other words; the construction and arrangement of my invention are such as to contemporaneously control both the mechanical and the electrical operating mechanism of the vehicle to prevent the operation of the vehicle when locked and permit such operation when unlocked, and to remind the operator to lock the vehicle before leaving it.

My invention includes the various novel features of construction and arrangement hereinafter more definitely specified. However, vehicle locks and signaling devices of the general character herein disclosed are claimed in both of my copending applications respectively Serial No. 688,819 and Serial No. 701,597 aforesaid.

In said drawings; Fig. I is a fragmentary plan view of a steering wheel spider and appurtenant mechanism conveniently embodying my invention; the arm of the spider extending to the right being broken off. Fig. II is a fragmentary elevation of the right hand side of the mechanism shown in Fig. I; which is conveniently the right hand side of the steering column cap as it is held stationary in the vehicle, and a wiring diagram of a typical electrical ignition circuit and a typical vehicle signaling circuit, indicating the relation of the same to the switch mechanism aforesaid. Fig. III is a fragmentary front elevation of the main ignition switch, which is mounted on the vehicle instrument board. Figs. IV and V are respective rear elevations of two different forms of the movable parts of main ignition switch mechanisms, either of which fits in the structure shown in Fig. III, and both of which are alternate stock equipment of "Ford" automobiles. Fig. VI is a perspective view of the lock body shown in dotted lines in Fig. I and in end elevation in Fig. II, and which is radially reciprocatory in said cap. Fig. VII is a perspective view of the cylindriform insulating support of the auxiliary switch indicated in Figs. I and II, but on an enlarged scale; the preceding figures showing the full size of the structure. Figs. VIII and IX are respective front elevations of the insulating back pieces of the ignition switch mechanisms shown respectively in Figs. IV and V; Figs. VIII and IX also showing the auxiliary switch device and respective wiring diagrams showing the electric relation of said switch to the two electric generators and spark coil aforesaid. Fig. X is a diametrical sectional view, taken on the line X, X in Fig. I, but showing the lock body withdrawn to unlocked position. Fig. XI is a right hand side elevation of the transversely reciprocatory spring pressed detent plunger which normally extends transversely from said lock body, as indicated in Fig. X. Fig. XII is a right hand side elevation of a modified form of locking plunger, similar to that shown in Figs. X and XI, but so constructed and arranged that the key must be employed in connection therewith both to fit the radially reciprocatory lock body in locked position, indicated in Fig. I, and to withdraw it therefrom to the locked position shown in Fig. X.

In said figures; the stationary steering column 1 is provided with the external screw thread 2 adapted to be engaged by the stationary column head cover or cap 3. Said cap has the circular recess 4, to hold electric contact rings, and has the key socket 5 adapted to receive a cylindrical key 6 which is driven downward therein across said screw thread 2, to normally prevent said cap from being unscrewed from said column, but which may be driven upward and out as hereinafter described. The steering shaft 7 is mounted to rotate in said column 1, and is operatively connected, by the spline key 8 with the steering wheel hub 9 which is detachably secured on said shaft by the nut 10 engaging the screw thread 11 at the upper end of said shaft. As indicated in Fig. I; said key 8 extends in the radial slot 12 in said shaft 7. Said steering wheel conveniently includes the spider 13 extending from said hub 9 and either rigidly or pivotally connected to an annular steering wheel rim; the arm extending to the right in Fig. I, but broken off, being provided at its outer end with a pivotal connection 14 for a tiltable form of steering wheel, as shown in Fig. X.

Said steering shaft 7, known to the trade as the "drive pinion shaft" has, in unitary relation therewith, the pinion teeth 15 forming the "sun" gear of the planetary train. Said shaft 7 is journaled at its lower end in the drive pinion bushing 16 which is rotatable in said column 1 and is held downward therein by the ring flange 17 which is drive fitted around said shaft 7 and extends in a complementary recess 18 in said cap 3. Said bushing 16 has at its upper end, three arms 19 carrying respective stud shafts 20 parallel with said shaft 7. The planetary pinions 21 are mounted to turn upon said stud shafts 20 in mesh with said pinion teeth 15 and in mesh with the internal orbital gear 23, which latter is formed in unitary relation with said column 1.

Said internal gear case cover or cap 3 has the axial bore 24 concentric with the axis of said shaft 7 and fitted to the slightly reduced circumference of said pinion teeth 15 extending above said stop flange ring 17; so that said shaft is thus journaled in said cover 3. Said internal gear case cap 3 also has, in unitary relation therewith, the lock casing 25 with the radial cylindrical lock socket 26 with which said pinion teeth 15 are adapted to successively register in every rotary position of said shaft 7. The locking device includes the primarily separate cylindrical body 28 fitted to reciprocate in said lock socket 26; the extent of its reciprocation being limited by the slot 29 in its top in which the screw 30 extends in rigid relation with said lock casing 25. Said body 28 has the segmental groove 27 in its perimeter arranged to register with said cap key seat 5, when said lock body 28 is withdrawn to unlocked position, so that said key 6 may then be driven downward into the position indicated in Fig. II or may be driven upward and outward from that position. However, when said locking device is in its locking position shown in Fig. I, said body 28 prevents removal of said cap key 6. As shown in Figs. I and VI; the inner end of said lock body 28 is grooved at 31 and has two teeth or ridges 32 fitted to engage anywhere in the circumferential series of locking recesses 33 between said pinion teeth 15 which are conveniently formed in unitary relation with said shaft 7. The rotation of said shaft 7 is thus prevented when said lock body is engaged therewith, as indicated in dotted lines in Fig. I; thus preventing operation of the steering mechanism which is connected to the lower end of said bushing 16.

Said lock 28 has pin tumblers extending radially in the thickest part of its wall around the cylindrical bore formed eccentrically to, but parallel with its axis, for the rotary key barrel 34; which barrel is rotatable by the removable key 35, to retract the detent or locking plunger 36 indicated in Figs. I, VI, and X; or to both project and retract the modified form of plunger 37 shown in Fig. XI. Said lock body 28 has a transverse diametrical bore for either of said plungers intersecting the axes of said body and said barrel 34. Said plungers 36 and 37 differ, first, in the axial extent of the transverse, segmental, crank notch 38 therein which is adapted to receive the crank 39 projecting from the inner end of said rotary key barrel 34 and, second, in that the lower end of the plunger 36 is cam inclined as indicated in Fig. X; whereas, the lower end of said plunger 37 is not. Each such plunger has a cylindrical spring seat, eccentric to the plunger axis, so as to clear its notch 38 and hold a spring 40 tending to project the plunger. Either plunger 36 or 37 is thus adapted for alternate engagement in the detent recesses 42 or 43, to detain said lock body 28 in either its inner locked position shown in Fig. I or in its outer unlocked position. However, the specific construction of said lock mechanism is disclosed and claimed in my copending applications Serial No. 688,819 and Serial No. 701,597 aforesaid.

When said key 35 is turned to retract the detent plunger 36 from the detent recess 42, and the lock body 28 is withdrawn from the locked position shown in Fig. I to the limit of its slot 29, said plunger 36 registers with said recess 43 and is automatically thrust therein, by said spring 40, to hold said lock body 28 out of engagement with said steering shaft 7, and thus permit the vehicle to be steered. Although in such unlocked position, said detent plunger 36 is spring pressed into said detent recess 43 enough to prevent the accidental inward movement of said lock body 28 into locked position; said body may be thrust inward, by the finger or thumb of the operator, without using said key 35; such movement of the lock body merely causing the lower cam inclined end of said plunger 36 to ride over the inner edge of the recess 43 and be thus thrust upward into said body 28 against the pressure of said spring 40 until said plunger 36 registers with the detent recess 42 into which it is automatically thrust by said spring, to the position shown in dotted lines in Fig. X, to detain said lock body 28 in locked position.

It may be observed that the lower end of each of said plungers 36 and 37 is of less diameter than its upper portion, so as to form a shoulder which is pressed by said spring 40 against the metal of said cap 3 so as to prevent said lock body 28 from rattling therein under any circumstances.

Said key 35 may be withdrawn from said lock 28 whenever the plunger 36 or 37 is projected, but cannot be withdrawn from said lock when the plunger is retracted into the lock body and, consequently, said key 35 serves as a handle by which said lock body 28 may be reciprocated. Of course, when said screw 30 is withdrawn from said slot 29, said lock body 28 may be withdrawn from its casing 25 and said cover 3; being thus separable as shown in Fig. VI. However, in the ordinary use of this form of my invention, said screw 30 remains in the position shown in Figs. I and X, and said lock 28 is continuously carried in said cover 3 which, as above described, is stationary in the automobile, its rotation and removal from the column 1 being normally prevented by the key 6 aforesaid. In order to prevent accidental dislodgement of said screw 30 from the position shown in the drawings; I prefer to provide the transverse slot 45 in the upper surface of said lock casing 25 with which the slot in said screw 30 is adapted to be registered as shown in Figs. I and X, and to slightly project the metal of said screw 30 into engagement with said casing 25 in said slot 45 as indicated at 46 in Fig.

I, by striking the top of said screw with a center punch. However, such projection of the metal of the screw is not sufficient to prevent its forcible operation by a screw driver.

Said nut 10 has an axial bore in which the push button 50 which is formed of insulating material, is mounted to reciprocate, but said button is normally upheld in the position shown in Fig. X by the spring terminal 51 which is held together with the spring terminal 52 in the insulating covering 53 and the disk 54. Said spring switch terminals 51 and 52 are respectively in unitary relation with conducting members which extend in said spline key seat 12 parallel with the axis of said shaft 7 and have, at their lower ends, respective spring contact brushes 55 and 56. Said contact brushes 55 and 56 are continuously in respective sliding contact with the stationary contact rings 57 and 58 which are separated and supported in axially spaced relation by the insulating tube 59, in said recess 4, as shown in section in Fig. X. Said contact rings 57 and 58 are insulated from said cap 3 by two similar thin plane insulating washers 60, which are shown in section in Fig. X extending respectively above the upper contact ring 57 and below the lower contact ring 58. Said contact rings 57 and 58 are precisely alike, but merely axially oppositely disposed, and each has a perforation 61 in its plane flange, as indicated in Fig. I, and said plane flanges are distorted axially at said perforations 61 to form respective recesses in which the ends of electric conductors 63 and 65 may be clinched in electric connection with the respective rings. Said conductors extend through the drilled passageway 66 in said cap 3 to the switch socket 67 which is conveniently formed by drilling said cap 3 parallel with its axial bore 24.

Said rings 57 and 58 and the insulating elements supporting and separating them from the metal of both said cap 3 and the steering shaft 7 are held in stationary position in said cap, by drive fitting, in the upper end of the recess 4 in which they are contained, the steel bearing ring 69 shown in section in Fig. X. Said conductors 63 and 65 extend from said passage 66 downward through said switch socket 67 in respective ducts 71 which are longitudinal grooves in the perimeter of the cylindriform insulating support 73 which is normally held stationary in said socket 67 by the set screw 74 engaging the conical seat 75 in said support. Accidental removal of said set screw may be prevented by distorting the metal of the cap 3 surrounding it at the outer end thereof, as indicated at 76 in Fig. II.

As best shown in Fig. VII; said switch support 73 has, in its cylindrical base 77, two parallel slots 78 to hold the two resilient metal terminals 79 and 80 which are offset above and below said base 77, as shown in Figs. VIII and IX, so as to prevent their longitudinal displacement. Said switch terminals 79 and 80 are encased by the insulating push piece 82 indicated in dotted lines in Figs. I, II, VIII and IX. As shown in Figs. I and II; said switch members 79 and 80 and their encasing push piece 82 project in the segmental notch 84 in said lock body 28, which is so proportioned that when said lock body is thrust inward to locking position as shown in Fig. I, said switch members are permitted to separate as indicated in Fig. VIII, to open the ignition circuit or other circuit controlling the operation of the vehicle motor and, when said lock body 28 is withdrawn to the locked position shown in Fig. X; said switch members are closed in contact, as shown in Fig. IX, thus closing said ignition or other circuit with which said terminals 79 and 80 are respectively connected by the conductors 86 and 87.

As indicated in Figs. I and II; when said lock body 28 is thrust inward into locked position, the cylindrical portion thereof at the outer end of said notch 84 extends beneath the overhanging upper end of said switch base 73, so that the latter cannot then be withdrawn, even if the screw 74 which holds it stationary, be removed. That is to say; the locking mechanism above described also locks said motor controlling switch device, carried by said support 73, against unauthorized removal. Moreover, I prefer to protect the electric conductors aforesaid and particularly said conductors 86 and 87, by extending them through a flexible coil tube 89 which extends from the column cap 3 into the steel sheath around the steering column 1, with which "Ford" automobiles are ordinarily provided, to protect the wires leading to the horn button which, in the "Ford" structure, is mounted on such sheath. As indicated in Fig. II, said protecting tube 89 is of an ordinary commercial form known as "armor" tube composed of helically wound overlapped steel strips, and it is to be understood that the lower end of said switch socket 67 in the column cap 3 is screw threaded at 90 to engage said tube 89 as a screw. However, a protecting tube may be formed of hardened steel cylindrical wire in the form of a close wound spring which may be similarly engaged as a screw in said switch socket 67. In either case; the conductors 63, 65, 86 and 87 may be drawn through said socket 67 and such armor tube 89, while the latter is straight, in which position it may be freely screwed into or out of connection with said threads in the cap 3. However, after the parts are thus assembled and said tube 89 flexed into the position it is intended to occupy in the vehicle; it is impossible to rotate it to unscrew it and, of course, it is difficult to cut and, therefore, protect the electric conductors within it from felonious or unauthorized disturbance.

As indicated in Fig. II; the conductors 63 and 65 extending from the switch controlled by said push button 50 are connected with a source of electric energy in the vehicle, indicated as a storage battery 94, and may include either an audible signaling device, indicated as a horn 95, or a visible singaling device, indicated as an incandescent electric lamp 96 provided with a reflector 97, or may be arranged to operate both in accordance with the position of the switch 99 shown in Fig. II. However, it is to be understood that said switch mechanism carried by the steering shaft 7 and operative by the push button 50, may be used to control an electric circuit of any kind; for instance, it may be used to complete the ignition circuit where the latter is broken by the switch mounted on said base 73 as above described. Such an arrangement is indicated at Fig. X.

In Fig. II, I have shown said conductors 86 and 87, which lead from the switch mounted on said support 73, included in an ignition circuit with the same storage battery 94. That circuit may include a main ignition switch, indicated at 100 in Fig. II, of either of the two forms shown respectively in Figs. IV and VIII and Figs. V and IX, or any other form. As indicated in Fig. II; that ignition switch 100 is adapted to alternately include either said battery 94 or the rotary generator 101 to energize the spark plugs 104 in the internal combustion engine 105 which is the vehicle motor. One side of each of said spark plugs 104 may be included in the ignition circuit by way of conductors leading to the usual rotary distributor 106, and have their opposite sides grounded upon the frame of the motor. However, for clarity of illustration, I have indicated wire conductors upon both sides of the ignition circuit in Fig. II.

As indicated in Fig. II; said ignition switch 100 includes separate generator terminals 108 and 109 leading respectively to said battery generator 94 and said rotary generator 101 which, as above contemplated, may be a magneto arranged to be driven by said motor 105. Said switch 100 also includes a movable member indicated at 110 in Fig. II, which is movable from one of said generator terminals to the other, but always retained in contact with either one of them. That is to say, the construction and arrangement of said main ignition switch is such that although its movable member 110 may be used to alternately connect either the battery or the magneto to energize the ignition circuit of the motor 105, it cannot be used to break that circuit. As indicated in Fig. II, said movable member 110 of the ignition switch is in the intermediate position which is nominally the "off" position, but then remains in electric connection with said terminal 109 so as to retain the magneto 101 in operative relation with the ignition circuit. However, said movable ignition switch member 110 is connected to the spark coil 111 and thence with said distributor 106 of the ignition circuit, by way of an auxiliary circuit including said conductors 86 and 87 and the switch mechanism including the terminals 79 and 80 which are controlled by the vehicle lock 28, as above described, so that said ignition circuit is broken at said auxiliary switch when said vehicle lock is placed in locked position, as indicated in Fig. I.

I find it desirable to provide said ignition circuit with the manually operative circuit breaking switch 113 so that, under abnormal conditions, said ignition circuit may be broken while the vehicle is unlocked. However, if such break switch 113 be included in the ignition circuit, it should be concealed or otherwise secluded from unauthorized use.

Fig. III is a fragmentary front elevation of the main ignition switch 100 as it appears upon the instrument board in a "Ford" car; the portion broken off at the right hand edge of Fig. III being constructed and arranged as a frame for an ammeter. That ordinary switch mechanism includes the lever 115 for controlling the vehicle lights and movable from the "off" position shown in Fig. III to alinement with the word "Dim" or to alinement with the word "On." However, said lighting mechanism may be allowed to remain stationary during the manipulation of the ignition switch mechanism which is mounted in concentric relation therewith and includes the member 110 which may be turned by the key 117, from the "off" position shown in Figs. III, IV and V to alinement with either of the extreme positions indicated by the symbols "Bat" and "Mag" in Fig. III; the construction and arrangement being such that the ignition circuit may thus alternately include either the battery or the magneto above described. Figs. IV and V are respective rear elevations of two different forms of the movable parts of the switch 100 indicated in Fig. III; each including a stationary circular case 118 fixed upon the back of the rectangular plate indicated in Fig. III. Each form includes rotatable resilient contacts 119 which are operatively connected with said lever 115 and used in conjunction with the outer circular series of contact terminals shown in Figs. VIII and IX, fixed in the circular insulating back pieces 121, to control the lighting system in the vehicle, and may be disregarded as far as the present invention is concerned. However, in the form of switch shown in Figs. IV and VIII; the movable switch member 110 shown in Fig. IV has a central contact 123 which is continuously maintained in electrical connection with the central terminal 124 in Fig. VIII, and said movable member 110 has the contact 126 which is movable from the battery terminal 127 to the magneto terminal 128 shown in Fig. VIII. As ordinarily constructed, in the type of switch illustrated in Figs. IV and VIII; said terminal 128 is merely a circular stud; but in accordance with my invention, I extend said terminal 128 toward said terminal 127 so that when said contact 126 is moved to the intermediate "off" position, in which it may be detained in the detent depression 130 shown in Fig. VIII, it remains in electrical connection with said magneto terminal 128. Consequently, in the "off" position of said switch 100 shown in said Figs. III, IV and VIII; the rotary generator 101 is retained in the ignition circuit which includes the spark coil 111. However, as above explained; such retention of the rotary generator 101 in the ignition circuit is effected by way of the auxiliary circuit including the conductors 86 and 87 respectively leading to the terminals 79 and 80 controlled by the vehicle lock 28 so that said circuit is completed until the vehicle is locked. Fig. VIII shows the auxiliary switch opened, corresponding with the locked position of the lock 28 shown in Fig. I.

The other form of ordinary switch mechanism indicated in Figs. V and IX differs from that above described with reference to Figs. IV and VIII in that the movable switch member 110 shown in Fig. V is intended to break connection with the inner circular series of terminals fixed in the insulating back piece 121 shown in Fig. IX at two points in the series instead of being continuously maintained in connection with a central terminal as is the form shown in Figs. IV and VIII. It may be observed that in the form shown in Fig. VIII, the spark coil 111 is connected to the central terminal 124, whereas, in the form shown in Fig. IX, the spark coil 111 is connected to the eccentric terminal 132; the battery being connected to the terminal 133. As ordinarily constructed, said terminals 132 and 133 are merely circular studs with which the diametrically opposite contacts 134 and 135 on the movable switch member 110 shown in Fig. V are adapted to connect when the switch key 117 shown in Fig. III is turned to alinement with the symbol "Bat" to then include the battery 94, shown in Fig. IX in circuit with the spark coil 111 and the remainder of the ignition circuit. In accordance with my invention, I extend each of said terminals 132 and 133 as indicated in Fig. IX, so that when said movable switch member 110 shown in Fig. V is in the "off" position, there shown, its contacts 134 and 135 may be detained in the detent depressions 137 and 138 of said coil terminal 132 and battery terminal 133 shown in Fig. IX, and thus retain the battery 94 in the ignition circuit in the "off" position; subject, however, to the breaking of the auxiliary circuit 86 and 87 at the auxiliary switch 79, 80 in Fig. IX, if and when the lock 28 is thrust into the locking position shown in Fig. I.

However, although I have shown the battery 94 indicated in the ignition circuit in the "off" position in Fig IX; it is preferable to retain the rotary generator 101 in said circuit in the "off" position, as above described with reference to Figs. IV and VIII; for the reason that such a chemically operative electrical generator as a storage battery 94 may be discharged to exhaustion if allowed to remain thus connected, whereas, the energy of the rotary generator 101 is not thus exhausted but continually renewed by its rotation. Moreover, it may be observed that although in the form of my invention shown in Figs. IV and VIII, neither the chemical generator 94 nor the rotary generator 101 can be included in the ignition circuit when the latter is broken at the auxiliary switch 79 and 80. On the contrary, in the form of my invention shown in Figs. V and IX, if the ignition circuit including the battery 94 be broken at the auxiliary switch 79, 80 by locking the vehicle, and thus excluding the battery 94 from the ignition circuit; the movable switch member 110 shown in Fig. V may be turned by the key 117 to the position in which the key is alined with the symbol "Mag" and, in that position, said member 110 connects said terminal 132 of the spark coil 111 shown in Fig. IX with the terminal 139 of the magneto 101 shown in that figure to include said magneto in the ignition circuit so that the car may be started by electrical energy from the rotary generator 101, by cranking it, whereas, the ordinary and preferable method of starting a "Ford" automobile is by first including the battery 94 in the ignition circuit until the motor 105 turns said generator 101.

Each form of my invention above described includes three switches, two in series relation to each other, and one in parallel relation to the other two.

Moreover, each of said forms includes an ignition switch with two distinct electric generator terminals and a member arranged to be movable from one of said terminals to the other, but retained in continual contact with either of them; so that the ignition circuit cannot be broken and the motor stopped by that switch; said ignition circuit being arranged to be broken by locking the vehicle, to thus remind the operator to lock the vehicle before leaving it. Furthermore, although I have indicated such vehicle electric systems in co-operative relation with locking devices applied to the vehicle steering system; it is to be understood that my invention includes the embodiment of such a system with a vehicle locking device of any type. For instance, in a vehicle of a closed type, the locking device may be applied to the door of the vehicle so that it is impossible to stop the vehicle motor until the vehicle door is locked.

Therefore, I do not desire to limit myself to the precise details of construction and arrangement herein set forth, as it is obvious that various modifications may be made therein without departing from the essential features of my invention, as defined in the appended claims.

I claim:

1. In a self-propelled vehicle, the combination with a motor; of an electric circuit controlling the operation of said motor when closed; two switches in said circuit, so arranged that both must be opened to stop said motor; and a lock for said vehicle, arranged to hold one of said switches closed until the vehicle is locked.

2. In a self-propelled vehicle, the combination with an internal combustion motor; of an electric ignition circuit controlling the operation of said motor; two switches in said circuit, so arranged that both must be opened to stop said motor; and a lock for said vehicle, arranged to hold one of said switches closed until the vehicle is locked.

3. In a self-propelled vehicle, the combination with a motor; of an electric circuit controlling the operation of said motor; two switches in said circuit, so arranged that both must be opened to stop said motor; steering mechanism, for said vehicle; and a lock constructed and arranged to hold one of said switches closed until said lock is moved to lock said steering mechanism in inoperative condition.

4. In a self-propelled vehicle, the combination with an internal combustion motor; of an electric ignition circuit controlling the operation of said motor; two switches in said circuit, so arranged that both must be opened to stop said motor; steering mechanism, for said vehicle; and a lock constructed and arranged to hold one of said switches closed until said lock is moved to lock said steering mechanism in inoperative condition.

5. In a self-propelled vehicle, the combination with a motor; of an electric circuit controlling the operation of said motor; two switches in said circuit, so arranged that both must be opened to stop said motor; steering mechanism, for said vehicle, including a stationary steering column and a rotary steering shaft, and a lock, supported by said column, constructed and arranged to hold one of said switches closed until said lock is moved to lock said steering shaft in inoperative condition.

6. In a self-propelled vehicle, the combination with an internal combustion motor; of an electric ignition circuit controlling the operation of said motor; two switches in said circuit, so arranged that both must be opened to stop said motor; steering mechanism, for said vehicle, including a stationary steering column and a rotary steering shaft; and a lock, supported by said column, constructed and arranged to hold one of said switches closed until said lock is moved to lock said steering shaft in inoperative condition.

7. In a self-propelled vehicle, the combination with an internal combustion motor; of an electric ignition circuit controlling the operation of said motor; two switches in said circuit, so arranged that both must be opened to stop said motor; steering mechanism, for said vehicle, including a stationary steering column and a rotary steering shaft; and a lock, supported by said column, constructed and arranged to hold one of said switches closed until said lock is moved to lock said steering shaft in inoperative condition; and a third switch, in parallel relation to the other two and local to the steering wheel.

8. In a self-propelled vehicle, the combination with an internal combustion motor; of an electric ignition circuit controlling the operation of said motor; two switches in said circuit, so arranged that both must be opened to stop said motor; steering mechanism, for said vehicle, including a stationary steering column and a rotary steering shaft; and a lock, supported by said column, constructed and arranged to hold one of said switches closed until said lock is moved to lock said steering shaft in inoperative condition; and a third switch, in parallel relation to the other two.

9. A motor vehicle controlling switch, including two distinct electric generator terminals and a member arranged to be movable from one of said terminals to the other, but retained in continual contact with one or the other of them; an ignition circuit connected to said movable member; two generator circuits connecting said terminals respectively with a storage battery and with a rotary electric generator, in alternate connection with said ignition circuit; an auxiliary switch in said generator circuits; and a lock for said vehicle, in cooperative relation with said auxiliary switch, arranged to close said auxiliary switch and generator circuits when the vehicle is locked, and open said auxiliary switch and generator circuits when said lock is unlocked, whereby one or the other of said generators is continuously included in said ignition circuit while the vehicle is unlocked.

In testimony whereof, I have hereunto signed my name at Philadelphia, Pennsylvania, this fifth day of April, 1924.

ARTHUR E. PAIGE.

Witnesses:
CAROLINE E. REUTER,
HAROLD C. METZ.